(12) United States Patent
Randall et al.

(10) Patent No.: US 12,203,443 B2
(45) Date of Patent: Jan. 21, 2025

(54) WIND TURBINE BLADE

(71) Applicant: Vestas Wind Systems A/S, Aarhus (DK)

(72) Inventors: Stephen Randall, Isle Of Wight (GB); Gurmukh Singh, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/531,818

(22) Filed: Dec. 7, 2023

(65) Prior Publication Data

US 2024/0209830 A1    Jun. 27, 2024

(51) Int. Cl.
*F03D 1/06* (2006.01)
*F03D 13/10* (2016.01)

(52) U.S. Cl.
CPC ......... *F03D 1/0675* (2013.01); *F03D 1/0688* (2023.08); *F03D 1/069* (2023.08);
(Continued)

(58) Field of Classification Search
CPC ...... F03D 1/0675; F03D 1/065; F03D 1/0681; F03D 1/0682; F03D 1/0684; F03D 1/0688; F03D 1/069; F03D 1/0633
See application file for complete search history.

(56) References Cited

U.S. PATENT DOCUMENTS 7,153,090 B2 * 12/2006 DeLeonardo ......... F03D 1/0675
415/4.4
7,427,189 B2 * 9/2008 Eyb ........................ F03D 1/065
416/241 A (Continued)

FOREIGN PATENT DOCUMENTS

EP    2409029 A2    1/2012
EP    3792481 A1    3/2021
(Continued)

OTHER PUBLICATIONS

European Patent Office, Extended European Search Report issued in corresponding EP Application No. 222159299.5. dated Jun. 15, 2023.

*Primary Examiner* — Woody A Lee, Jr.
*Assistant Examiner* — Behnoush Haghighian
(74) *Attorney, Agent, or Firm* — Wood Herron & Evans LLP

(57) ABSTRACT

A wind turbine blade comprising a leeward shell portion and a windward shell portion, each of the shell portions extending in a chordwise direction between a leading edge and a trailing edge of the wind turbine blade; a leading reinforcement arrangement comprising at least a leading leeward reinforcement structure engaging the leeward shell portion and a leading windward reinforcement structure engaging the windward shell portion; and a trailing reinforcement arrangement comprising at least a trailing leeward reinforcement structure engaging the leeward shell portion and a trailing windward reinforcement structure engaging the windward shell portion. The trailing windward reinforcement structure has a first stiffness in the lengthwise direction and the trailing leeward reinforcement structure has a second stiffness in the lengthwise direction, wherein the first stiffness is greater than the second stiffness at a chordwise plane of the wind turbine blade.

17 Claims, 5 Drawing Sheets

(52) U.S. Cl.
CPC .......... *F03D 13/10* (2016.05); *F05B 2220/30* (2013.01); *F05B 2230/60* (2013.01); *F05B 2240/221* (2013.01)

(56) References Cited

U.S. PATENT DOCUMENTS

| | | | | |
|---|---|---|---|---|
| 7,811,063 | B2 * | 10/2010 | Bonnet | F03D 1/0675 416/500 |
| 8,043,067 | B2 * | 10/2011 | Kuroiwa | F03D 1/0675 416/223 R |
| 8,702,397 | B2 * | 4/2014 | Babu | F03D 1/0675 416/226 |
| 10,180,125 | B2 * | 1/2019 | Carroll | F03D 1/0633 |
| 10,302,065 | B2 * | 5/2019 | Smith | B32B 5/26 |
| 10,487,797 | B2 * | 11/2019 | Hancock | B29C 70/865 |
| 10,767,625 | B2 * | 9/2020 | Kamruzzaman | F03D 1/0633 |
| 10,821,696 | B2 * | 11/2020 | Roberts | B29C 70/682 |
| 11,002,247 | B2 * | 5/2021 | Roberts | F03D 1/0633 |
| 11,028,824 | B2 * | 6/2021 | Garm | F03D 1/0675 |
| 11,371,482 | B2 * | 6/2022 | Hancock | B29C 70/84 |
| 11,448,182 | B2 * | 9/2022 | Smith | B29C 65/48 |
| 11,629,690 | B2 * | 4/2023 | Hancock | B29C 70/443 156/60 |
| 11,939,948 | B2 * | 3/2024 | Mukherjee | F03D 1/0675 |
| 11,988,190 | B2 * | 5/2024 | Mukherjee | B29D 99/0028 |
| 2007/0189903 | A1 * | 8/2007 | Eyb | F03D 1/065 416/230 |
| 2008/0107540 | A1 * | 5/2008 | Bonnet | F03D 1/0675 415/119 |
| 2009/0169392 | A1 * | 7/2009 | Kuroiwa | F03D 1/0675 416/241 A |
| 2010/0047070 | A1 * | 2/2010 | Slot | F03D 1/065 416/223 R |
| 2010/0135818 | A1 * | 6/2010 | Babu | F03D 1/0675 29/889.7 |
| 2010/0143142 | A1 * | 6/2010 | Akhtar | F03D 1/0675 29/889.71 |
| 2010/0143146 | A1 * | 6/2010 | Bell | F03D 1/06 416/233 |
| 2010/0143147 | A1 | 6/2010 | Akhtar et al. | |
| 2011/0142662 | A1 * | 6/2011 | Fritz | F03D 1/0675 416/233 |
| 2013/0094970 | A1 * | 4/2013 | Fukami | F03D 1/0633 416/223 R |
| 2014/0234114 | A1 * | 8/2014 | Schibsbye | F03D 1/0675 416/226 |
| 2014/0301859 | A1 * | 10/2014 | Hancock | F03D 1/0675 156/60 |
| 2017/0058866 | A1 | 3/2017 | Caruso et al. | |
| 2018/0051672 | A1 * | 2/2018 | Merzhaeuser | F03D 13/10 |
| 2019/0024631 | A1 * | 1/2019 | Tobin | F03D 1/0641 |
| 2020/0049128 | A1 * | 2/2020 | Hancock | B29C 70/84 |
| 2021/0102523 | A1 * | 4/2021 | Smith | B29C 66/112 |
| 2022/0178347 | A1 * | 6/2022 | Mukherjee | B29C 66/727 |
| 2022/0234319 | A1 * | 7/2022 | Wenningsted | B29C 66/861 |
| 2022/0290648 | A1 * | 9/2022 | Hancock | B29D 99/0025 |
| 2022/0314568 | A1 * | 10/2022 | Mukherjee | B29C 65/7876 |
| 2022/0325692 | A1 * | 10/2022 | Mukherjee | B29C 70/443 |
| 2023/0078908 | A1 * | 3/2023 | Mukherjee | B29C 66/532 416/226 |
| 2023/0366374 | A1 * | 11/2023 | Tan | F03D 1/0684 |
| 2024/0167451 | A1 * | 5/2024 | Nielsen | B29D 99/0028 |

FOREIGN PATENT DOCUMENTS

| | | |
|---|---|---|
| WO | 2010107592 A2 | 9/2010 |
| WO | 2022188936 A1 | 9/2022 |

* cited by examiner

WIND TURBINE BLADE

CROSS-REFERENCE TO RELATED APPLICATION

This application is a U.S. Non-provisional Patent Application claiming priority to European Patent Application No. EP 22215929.5, filed Dec. 22, 2023, entitled "A Wind Turbine Blade", the disclosure of which is hereby incorporated by reference herein in its entirety.

TECHNICAL FIELD

The present invention relates to a wind turbine blade, particularly a wind turbine blade for a horizontal-axis wind turbine. The invention further relates to a method for manufacturing a wind turbine blade and use of a trailing reinforcement arrangement.

BACKGROUND OF THE INVENTION

As a part of the worldwide transition into renewable energy, there is a demand for wind turbines of increased size and efficiency. Mechanical properties of wind turbine blades, however, impose limitations on the size of the blades and thus on the power output of wind turbines. During use, wind turbine blades are subject to static and dynamic loads incurred by the wind acting on the blades, i.e., aerodynamic loads, as well as gravitational loads.

Loads induced by wind acting on a wind turbine blade are generally referred to as flapwise loads, and loads induced by gravity are generally referred to as edgewise loads. During use of the blade, its pressure side is generally subjected to tension, and its suction side is generally subjected to compression.

The pressure side can also be referred to as the windward side, and the suction side can also be referred to as the leeward side.

To counteract loads on blades, reinforcement structures such as spar caps may be embedded or attached in wind turbine blades to engage with leeward and/or windward shell portions to provide enhanced tensile and/or compressive strength. Further, such reinforcement structures may be interconnected by shear webs. Reinforcement structures such as spar caps may include longitudinally aligned carbon fibres integrated in, e.g., pultruded elements which may be designed to resist a certain predetermined level of tensile and compressive loads.

A demand for ever-increasing wind turbine blade sizes imposes practical challenges in relation to ensuring that blades can adhere to stability requirements, for example with regard to any combination of flapwise/edgewise/torsion vibration or whirling modes.

A simple solution to improve mechanical strength and/or vibrational properties of a wind turbine blade is to improve stiffness of all reinforcement structures, for example by adding additional layers of pultruded fibre elements. However, such additional layers increase the mass of the blade which is generally not desirable.

Hence, there is a need for concepts which can provide wind turbine blades with improved strength and/or vibrational resistance, preferably at a minimum increase in blade mass.

SUMMARY OF THE INVENTION

On the above background, it is an object of preferred embodiments of the invention to provide a wind turbine blade with improved strength and/or vibrational properties, such as improved vibrational damping, with no or only minimal cost in terms of increased blade mass.

A first aspect of the present disclosure relates to a wind turbine blade extending in a lengthwise direction between a root end and a tip end, the wind turbine blade comprising:
 a leeward shell portion and a windward shell portion, each of the shell portions extending in a chordwise direction between a leading edge and a trailing edge of the wind turbine blade;
 a leading reinforcement arrangement extending in the lengthwise direction and comprising at least a leading leeward reinforcement structure engaging the leeward shell portion and a leading windward reinforcement structure engaging the windward shell portion; and
 a trailing reinforcement arrangement extending in the lengthwise direction and comprising at least a trailing leeward reinforcement structure engaging the leeward shell portion and a trailing windward reinforcement structure engaging the windward shell portion,
wherein each respective reinforcement structure of the leading reinforcement arrangement is closer to the leading edge than each respective reinforcement structure of the trailing reinforcement arrangement,
wherein the trailing windward reinforcement structure has a first stiffness in the lengthwise direction and the trailing leeward reinforcement structure has a second stiffness in the lengthwise direction,
wherein the first stiffness, i.e., in the lengthwise direction, is greater than the second stiffness, i.e., in the lengthwise direction, at a chordwise plane of the wind turbine blade, the chordwise plane being transverse to the lengthwise direction.

Embodiments of the invention provides redistributed stiffnesses among reinforcement structures of the blade, particularly among the reinforcement structures of the trailing reinforcement arrangement. Instead of being equal, the stiffnesses in the trailing leeward reinforcement structure and the trailing windward reinforcement structure are configured such that the stiffness in the trailing windward reinforcement structure is greater than the stiffness in the trailing leeward reinforcement structure.

It has been found that the strength and/or vibrational properties of the wind turbine blade may thereby be improved. For example, the damping ratio of the blade may be reduced at specific wind speeds, at specific rotational speeds, and/or at specific vibrational frequencies.

The improved vibrational properties achieved by embodiments of the present invention can be explained by considering the principal axes of blade bending. The principal axes of an elongated body supported at one end impose natural directions of bending of that body. If considering only a chordwise section or a chordwise plane of the wind turbine blade, that local section or plane may have local principal axes.

Given a chordwise plane of a conventional wind turbine blade, the principal axes of bending in this plane typically correspond approximately to the directions of edgewise and flapwise bending and vibration. By providing an asymmetry or imbalance of stiffness in a chordwise plane of the blade relative to the lengthwise direction in the trailing reinforcement arrangement, i.e., by the provision of a higher stiffness in the trailing windward reinforcement structure than in the trailing leeward reinforcement structure, the principal axes of bending are rotated or displaced in comparison with a blade section not having such asymmetry or imbalance of stiffness. It has been found that the displacement or rotation of one or more axes of bending can improve vibrational properties. This may particularly be the case if a principal axis of bending changes along the longitudinal direction of the blade. A varying principal axis of bending may result in improved dampening of vibrations.

Asymmetric stiffness in the trailing reinforcement arrangement is of particular interest in the context of the present invention. The principal axes of bending at a chordwise plane is determined by the stiffness of relevant reinforcement structures as well as their position within this plane with respect to a principal axis along the lengthwise direction of the blade perpendicular to the chordwise plane. The trailing reinforcement arrangement is typically arranged at a distance from the aforementioned principal axis which is larger than the distance from that axis to the leading reinforcement arrangement, and consequently, the effect of an asymmetric configuration of the stiffnesses of the windward and leeward reinforcement structures is greater in respect of the trailing reinforcement arrangement than in respect of the leading reinforcement arrangement.

An asymmetric stiffness in the trailing reinforcement arrangement may be complimented by a reversed stiffness imbalance in the reinforcement structures of the leading reinforcement arrangement, i.e., by providing the leading leeward reinforcement structure with a greater stiffness than the leading windward reinforcement structure. This can contribute to maintaining a certain flexural rigidity of the blade despite the stiffness imbalance in the trailing reinforcement arrangement. This is particularly relevant given potentially different compressive and tensile properties of reinforcement structures, for example due to different compressive and tensile properties of carbon fibres. Moreover, a reversed stiffness imbalance in the leading reinforcement arrangement can further rotate the principal axes at a chordwise plane to additionally enhance rotational and/or stiffness properties.

A difference in stiffness can be obtained providing the reinforcement structures with different thicknesses or different widths (i.e., different cross-sectional areas), different number of layers of, e.g., pultruded elements, different materials, such as glass-fibre and carbon-fibre reinforced plastics, or any combination of different number of layers or different materials.

Further, the difference in stiffness can be implemented along the entire length of any of the reinforcement structures of the trailing reinforcement arrangements, or it can be implemented locally, for example along, e.g., 15 meters of the blade in the longitudinal direction.

Typically, the leeward shell portion is the portion of the shell of the wind turbine blade located at a leeward side of the wind turbine blade. Similarly, the windward shell portion is typically the portion of the shell of the wind turbine blade located at the windward side of the wind turbine blade. The leeward shell portion and the windward shell portion may be interconnected at the trailing edge and/or at the leading edge.

The leeward shell portion and the windward shell portion typically define an airfoil profile of the wind turbine blade configured to generate a lift corresponding to an aerodynamic pressure difference between the windward shell portion and the leeward shell portion.

Part of the wind turbine blade may have a truncated trailing edge to define a flatback airfoil section.

A reinforcement structure according to the present disclosure typically extends in the lengthwise direction. It engages with a shell portion to thereby resist deformation of that shell portion, particularly at the chordwise plane, thereby counteracting flapwise bending and vibration. A reinforcement structure may be integrated into a shell portion or bonded to a shell portion to engage that shell portion. An example of a reinforcement structure is a spar cap known per se.

Wind turbine blades according to examples of the present disclosure comprise both a leading reinforcement arrangement and a trailing reinforcement arrangement, each of these arrangements comprising at least two reinforcement structures, one engaging each respective one of the shell portions. The reinforcement structures of the leading reinforcement arrangement thereby resist deformation of a leading part of the blade, and the reinforcement structures of the trailing reinforcement arrangement resist deformation of a trailing part of the blade.

The reinforcement structures of a reinforcement arrangement may be interconnected by a shear web. For example, the leading leeward reinforcement structure and the leading windward reinforcement structure may be interconnected by at least one leading web, and/or the trailing leeward reinforcement structure and the trailing windward reinforcement structure may be interconnected by at least one trailing web.

Typically, the leading reinforcement arrangement comprises two reinforcement structures, but in some examples, the leading reinforcement arrangement comprises more than two reinforcement structures, for example three reinforcement structures or four reinforcement structures.

Similarly, the trailing reinforcement arrangement typically comprises two reinforcement structures, but it may comprise more reinforcement structures, such as three or four reinforcement structures.

In case a reinforcement arrangement comprises more than two reinforcement structures, these may typically be interconnected by more than one shear web.

Embodiments of the present invention may comprise a middle reinforcement arrangement extending in the lengthwise direction and comprising at least a middle leeward reinforcement structure engaging the leeward shell portion and a middle windward reinforcement structure engaging the windward shell portion, wherein each respective reinforcement structure or the middle reinforcement arrangement is positioned between the leading reinforcement arrangement and the trailing reinforcement arrangement relative to the chordwise direction. Alternatively or additionally, a reinforcement arrangement, such as the leading reinforcement arrangement, may also comprise more than two reinforcement structures, for example a first (leading) windward reinforcement structure, a second (leading) windward reinforcement structure, and a third (leading) leeward reinforcement structure, for example interconnected by a V-shaped (leading) web.

The leading reinforcement arrangement and the trailing reinforcement arrangement are defined by their respective locations in the shell portions, i.e., each respective reinforcement structure of the leading reinforcement arrangement is closer, when seen in the chordwise direction, to the leading edge than each respective reinforcement structure of the trailing reinforcement arrangement.

The stiffness of an element is a measure which is indicative of the extent to which an object resists deformation in response to an applied force. Typically, the stiffness k is quantified as $k=F/d$, where F is a force and d is a displacement.

The stiffness is different from the elastic modulus of a material, but the stiffness of a given reinforcement structure does depend on the elastic modulus of the material or materials, from which that reinforcement structure is made. For example, for an exemplary element the stiffness is $k = E \times A/L$, where E is the elastic modulus, A is cross-sectional area (transverse to direction of tension/compression) and L is the length of the element.

Examples of the present disclosure provide that the first stiffness, i.e., lengthwise stiffness, of a trailing windward reinforcement structure is greater than a second stiffness, i.e., lengthwise stiffness, of a trailing leeward reinforcement structure at a given chordwise plane of the wind turbine blade transverse to the lengthwise direction. In practice, the stiffness at a chordwise plane may be determined in a lengthwise portion of the relevant reinforcement arrangement relative to that chordwise plane. Thus, in examples of the present disclosure, the first stiffness and the second stiffness are determined in a lengthwise portion of one length unit.

All reinforcement structures referred to above extend along a lengthwise portion in the lengthwise direction of the wind turbine blade.

For some types of reinforcement structures, the stiffness in tension and the stiffness in compression may be different. In such cases, the relevant stiffnesses may be the stiffnesses in tension. That is, in some examples of the present disclosure, the first stiffness and the second stiffness are tensional stiffnesses.

In examples of the present disclosure, the wind turbine blade has a blade length in the lengthwise direction of at least 60 meters, for example at least 75 meters, such as at least 90 meters.

In examples of the present disclosure, each of the trailing reinforcement arrangements extend at least 35 meters, for example at least 45 meters, such as at least 55 meters.

Generally, embodiments of the present disclosure improve the properties of large wind turbine blades, i.e. wind turbine blades having a length of at least 60 meters.

In examples of the present disclosure, the first stiffness is greater than the second stiffness in at least a part of an extent along the lengthwise direction from 15% to 55% of a relative length of the blade measured from the root end to the tip end, for example an extent from 20% to 45%, such as an extent from 25% to 35% of the relative length of the blade.

It has been found that the vibrational properties of the wind turbine blade may be particularly improved if the stiffness imbalance is implemented along at least a part of a particular extent of the blade as exemplified in the above ranges.

Further, it can be desirable to only introduce an asymmetry in stiffness locally so as not to compromise other mechanical properties of the blade.

In examples of the present disclosure, the first stiffness is at least 5% greater than the second stiffness, for example at least 15% greater than the second stiffness, such as at least 25% greater than the second stiffness.

The provision of a certain minimum difference between the first stiffness and the second stiffness may ensure that the vibrational properties are also improved to a certain level.

In examples of the present disclosure, the first stiffness is greater than the second stiffness along at least 10% of the length of the wind turbine blade in the lengthwise direction, for example along at least 15% of the length, such as along at least 20% of the length.

The provision of a certain extent in which the first stiffness is greater than the second stiffness may ensure that the vibrational properties are also improved to a certain level.

In examples of the present disclosure, a stiffness ratio of the first stiffness to the second stiffness varies along the lengthwise direction.

The provision of a varying stiffness ratio along the lengthwise direction may contribute to efficiently improving the vibrational properties of the wind turbine blade without compromising other mechanical properties of the blade. For example, the first stiffness can be greater than the second stiffness in one section, whereas the two stiffnesses may be substantially the same in another section along the lengthwise extent of the blade.

In examples of the present disclosure, both the trailing leeward reinforcement structure and the trailing windward reinforcement structure extend in the lengthwise direction along a mid-span section and along an outboard section neighbouring the mid-span section and arranged closer to the tip end than the mid-span section, wherein the stiffness ratio is greater in a part of the mid-span section than in a part of the outboard section.

An improvement of the vibrational properties of the wind turbine blade can be particularly significant if the stiffness ratio is greater in at least a part of the mid-span section than in the outboard section of the blade.

In examples of the present disclosure, both the trailing leeward reinforcement structure and the trailing windward reinforcement structure further extend in the lengthwise direction along an inboard section neighbouring the mid-span section and arranged closer to the root end than the mid-span section, wherein the stiffness ratio is greater in a part of the mid-span section than in a part of the inboard section.

The enhancement of vibrational properties of the wind turbine blade may be of particular benefit if the stiffness ratio is greater in at least a part of the mid-span section than in the inboard section of the blade.

In examples of the present disclosure, the stiffness ratio is greater throughout the mid-span section, wherein the length of the mid-span section is at least 10% of the length of the wind turbine blade in the lengthwise direction, for example at least 15%, such as at least 20%.

The provision of certain minimal range in which the stiffness ratio is greater as exemplified above may ensure that vibrational properties are effectively enhanced.

In examples of the present disclosure, the length of the mid-span section is at most 35% of the length of the wind turbine blade, for example at most 30%, such as at most 25%.

It may hence be ensured that other mechanical properties of the blade are not compromised while vibrational properties of the blade are still improved.

In examples of the present disclosure, the first stiffness is greater in at least part of the mid-span section than the second stiffness in any part of the leeward windward reinforcement structure.

A maximum stiffness in the trailing windward reinforcement structure in the mid-span section has been found to potentially provide further improved vibrational properties of the wind turbine blade.

In examples of the present disclosure, the trailing windward reinforcement structure extends further than the trailing leeward reinforcement structure along the lengthwise direction, such that the trailing windward reinforcement structure terminates closer to the tip end than the trailing leeward reinforcement structure.

The provision of a trailing windward reinforcement structure which extents further than the trailing leeward reinforcement structure may potentially further improve vibrational properties of wind turbine blades.

In examples of the present disclosure, the first stiffness and/or the second stiffness decrease towards the tip end in the outboard section.

In other words, the first stiffness and the second stiffness may be greater in a central region of the wind turbine blade, such as in the mid-span section.

In examples of the present disclosure, a subsection of the wind turbine blade along the lengthwise direction has a flatback airfoil section having a truncated trailing edge.

The first stiffness may be greater than the second stiffness within the flatback airfoil section.

The flatback airfoil section may overlap the mid-span section along the lengthwise direction.

As previously discussed, asymmetric stiffnesses in the trailing reinforcement arrangement can be particularly efficient in improving vibrational properties, in comparison to asymmetric stiffnesses in, e.g., the leading reinforcement arrangement, due to the position of the relevant reinforcement structures relative to the principal axis along the lengthwise direction of the blade.

Similarly, asymmetric stiffness in a trailing reinforcement arrangement can be even more efficient if the wind turbine blade has a flatback airfoil section since the trailing reinforcement arrangement is typically further displaced in a flatback airfoil section relative to the principal axis along the lengthwise direction of the blade. In particular, the effects of the asymmetric stiffness configuration may be improved when the first stiffness is greater than the second stiffness within the flatback airfoil section, i.e., when the chordwise plane lies within the flatback airfoil section and/or if the flatback airfoil section overlaps the mid-span section along the lengthwise direction of the blade.

In examples of the present disclosure, the leading reinforcement arrangement and/or the trailing reinforcement arrangement are formed by layers of pultruded fibre elements, preferably comprising carbon fibre-reinforced plastic.

Layers of pultruded fibre elements constitutes an implementation of reinforcements structures known per se. The layers of pultruded fibre elements may be saturated with cured resin which at least partly fills the gaps between fibre elements and binds the fibre elements together. Pultruded fibre elements according to the presented disclosure may include carbon fibres or, alternatively, include glass fibre-reinforced plastic.

In examples of the present disclosure, the trailing windward reinforcement structure has a greater cross-sectional area than and/or different material composition than the trailing leeward reinforcement structure, preferably a greater thickness than and/or different material composition than the trailing leeward reinforcement structure.

For example, the trailing windward reinforcement structure and the trailing leeward reinforcement structure both comprise pultruded fibre elements, in which the trailing windward reinforcement structure has a larger relative number of carbon fibres than the trailing leeward reinforcement structure. For example, the trailing windward reinforcement structure has 100% carbon fibres by total fibre mass, whereas the trailing leeward reinforcement structure has 50% carbon fibres and 50% glass fibres by total fibre mass.

The greater cross-sectional area and/or different material composition may preferably be at the chordwise plane in which the first stiffness is greater than the second stiffness. Hence, the first stiffness may be greater than the second stiffness due to the greater cross-sectional area and/or different material composition.

In practice, having a greater thickness in the trailing windward reinforcement structure than in the trailing leeward reinforcement structure is relatively easy to implement and requires no major changes in blade design. Especially if the reinforcement structure is made up of pultruded layers, then the implementation of a greater thickness merely involves stacking additional layers.

Generally, the thickness of a reinforcement structure may be measured in a direction perpendicular to a part of the shell portion with which that reinforcement structure engages.

Generally, a cross-sectional area of a reinforcement structure may be determined, measured, or evaluated in or at the chordwise plane.

In examples of the present disclosure, the leading windward reinforcement structure has a third stiffness in the lengthwise direction and the leading leeward reinforcement structure has a fourth stiffness in the lengthwise direction, wherein the fourth stiffness is greater than the third stiffness at the chordwise plane of the wind turbine blade transverse to the lengthwise direction.

The chordwise plane in which the fourth stiffness is greater than the third stiffness is the same chordwise plane as in which the first stiffness is greater than the second stiffness.

In examples of the present disclosure, the trailing windward reinforcement structure has a first cross-sectional area and the trailing leeward reinforcement structure has a second cross-sectional area, wherein the first cross-sectional area is greater than the second cross-sectional area at the chordwise plane.

The above-outlined provision constitutes a possible implementation of the first cross-sectional area being greater than the second cross-sectional area. Hence, in examples of the present disclosure, the provision of the trailing windward reinforcement structure having a first stiffness in the lengthwise direction and the trailing leeward reinforcement structure having a second stiffness in the lengthwise direction, wherein the first stiffness is greater than the second stiffness can comprise the provision of the trailing windward reinforcement structure having a first cross-sectional area and the trailing leeward reinforcement structure having a second cross-sectional area, wherein the first cross-sectional area is greater than the second cross-sectional area.

Thus, in a general aspect, the invention provides a wind turbine blade extending in a lengthwise direction between a root end and a tip end, the wind turbine blade comprising:
  a leeward shell portion and a windward shell portion, each of the shell portions extending in a chordwise direction between a leading edge and a trailing edge of the wind turbine blade;
  a leading reinforcement arrangement extending in the lengthwise direction and comprising at least a leading leeward reinforcement structure engaging the leeward shell portion and a leading windward reinforcement structure engaging the windward shell portion; and
  a trailing reinforcement arrangement extending in the lengthwise direction and comprising at least a trailing leeward reinforcement structure engaging the leeward shell portion and a trailing windward reinforcement structure engaging the windward shell portion,
wherein each respective reinforcement structure of the leading reinforcement arrangement is closer to the leading edge than each respective reinforcement structure of the trailing reinforcement arrangement,
wherein the trailing windward reinforcement structure has a first cross-sectional area at a chordwise plane and the trailing leeward reinforcement structure has a second cross-sectional area at the chordwise plane, the chordwise plane being transverse to the lengthwise direction, wherein the first cross-sectional area is greater than the second cross-sectional area.

In examples of the present disclosure, the leading leeward reinforcement structure has a has a greater cross-sectional area than and/or different material composition than the leading windward reinforcement structure, preferably a greater thickness than and/or different material composition than the leading windward reinforcement structure.

The greater cross-sectional area and/or different material composition in the reinforcement structures of the leading reinforcement arrangement may preferably be at the chordwise plane in which the first stiffness is greater than the second stiffness. Hence, the fourth stiffness may be greater than the third stiffness due to the greater cross-sectional area and/or different material composition.

In examples of the present disclosure, the leading windward reinforcement structure has a third cross-sectional area, preferably a third thickness, and the leading leeward reinforcement structure has a fourth cross-sectional area, preferably a fourth thickness, wherein the fourth cross-sectional area is greater than the third cross-sectional area at the chordwise plane.

In examples of the present disclosure, each reinforcement structure of the leading reinforcement arrangement has a respective stiffness in the lengthwise direction greater than first stiffness and the second stiffness.

In examples of the present disclosure, the wind turbine blade has a principal axis of bending transverse to the lengthwise direction, wherein the first stiffness greater than the second stiffness causes a principal axis of bending to be different in different chordwise planes transverse to the lengthwise direction.

The provision of a principal axis of bending being different at different chordwise planes may provide improved vibrational properties. Preferably, the different chordwise planes lie within the extent of the trailing windward reinforcement structure and the trailing leeward reinforcement structure.

In examples of the present disclosure, the principal axis of bending differs by at least 2 degrees at different chordwise planes, the different chordwise planes being transverse to the lengthwise direction, for example at least 3 degrees, such as at least 4 degrees.

The provision of a minimum difference of principle axes of bending at different chordwise planes may ensure that the vibrational properties of the blade are improved further.

In examples of the present disclosure, the leading leeward reinforcement structure and the leading windward reinforcement structure comprise respective upper and lower leading spar caps interconnected by a leading web.

In examples of the present disclosure, the trailing leeward reinforcement structure and the trailing windward reinforcement structure comprise respective upper and lower trailing spar caps interconnected by a trailing web.

A second aspect of the present disclosure relates to a method for manufacturing a wind turbine blade, the method comprising the steps of:
  engaging a leading leeward reinforcement structure and a trailing leeward reinforcement structure with a leeward shell portion;
  engaging a leading windward reinforcement structure and a trailing windward reinforcement structure with a windward shell portion; and
  forming a wind turbine blade from the leeward shell portion and the trailing shell portion, the wind turbine blade extending in a lengthwise direction between a root end and a tip end, each of the shell portions extending in a chordwise direction between a leading edge and a trailing edge of the wind turbine blade thereby providing a leading reinforcement arrangement comprising at least the leading leeward reinforcement arrangement and the leading windward reinforcement arrangement and providing a trailing reinforcement arrangement comprising at least the trailing leeward reinforcement structure and the trailing windward reinforcement structure, the leading reinforcement arrangement and the trailing reinforcement arrangement extending in the lengthwise direction, wherein each respective reinforcement structure of the leading reinforcement arrangement is closer to the leading edge than each respective reinforcement structure of the trailing reinforcement arrangement, wherein the trailing windward reinforcement structure has a first stiffness in the lengthwise direction and the trailing leeward reinforcement structure has a second stiffness in the lengthwise direction, wherein the first stiffness, i.e., in the lengthwise direction, is greater than the second stiffness, i.e., in the lengthwise direction, at a chordwise plane of the wind turbine blade, the chordwise plane being transverse to the lengthwise direction.

The leeward shell portion and the windward shell portion may for example be manufactured separately and then connected afterwards at the leading edge and/or at the trailing edge. The leeward shell portion and the windward shell portion may alternatively be moulded as a single part.

The wind turbine blade manufactured according to the second aspect may be a wind turbine blade according to any of the examples of the first aspect.

A third aspect of the present disclosure relates to use of a trailing reinforcement arrangement to reduce vibrational damping in a wind turbine blade, for example a wind turbine blade according to the first aspect of the present disclosure, wherein the trailing reinforcement arrangement extends in a lengthwise direction of the wind turbine blade and comprises at least a trailing leeward reinforcement structure engaging a leeward shell portion of the wind turbine blade and a trailing windward reinforcement structure engaging a windward shell portion of the wind turbine blade, wherein the trailing windward reinforcement structure has a first stiffness in the lengthwise direction and the trailing leeward reinforcement structure has a second stiffness in the lengthwise direction, wherein the first stiffness, i.e., in the lengthwise direction, is greater than the second stiffness, i.e., in the lengthwise direction, at a chordwise plane of the wind turbine blade, the chordwise plane being transverse to the lengthwise direction.

Any advantages or improvements of the first aspect may also be provided by the third aspect.

BRIEF DESCRIPTION OF THE DRAWINGS

Embodiments of the invention will now be further described by reference to the accompanying drawings, in which.

DETAILED DESCRIPTION OF THE DRAWINGS

It should be understood that the detailed description and specific examples, while indicating embodiments of the disclosure, are given by way of illustration only, since various changes and modifications within the spirit and scope of the disclosure will become apparent to those skilled in the art from this detailed description.

Figure 1:
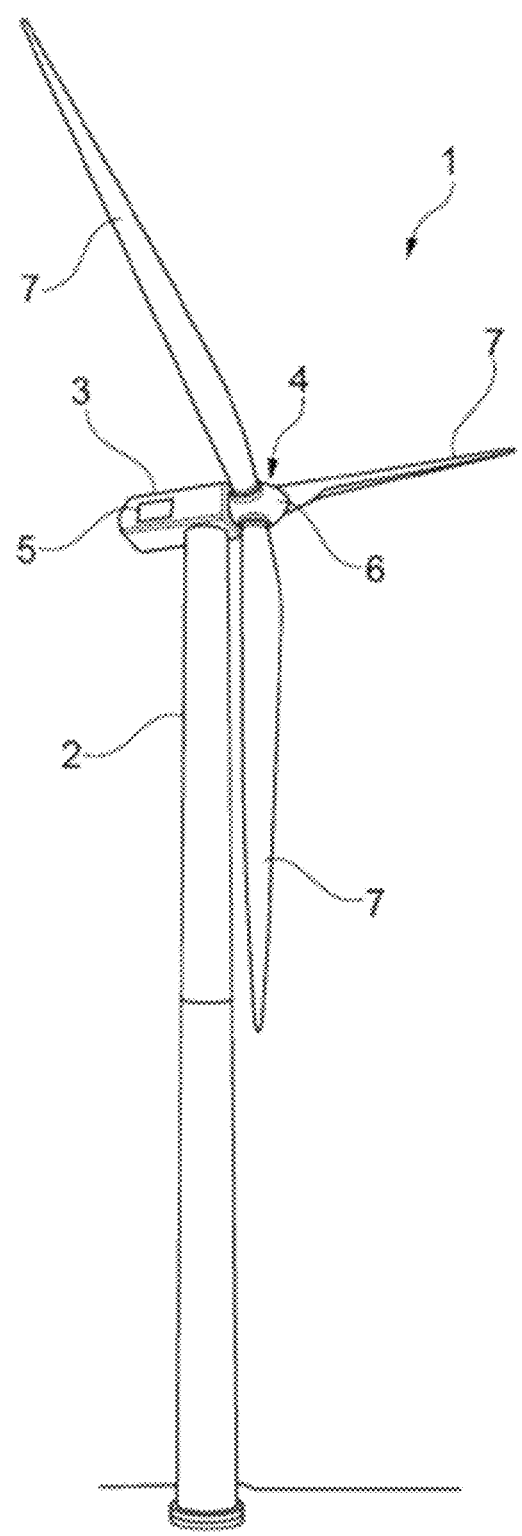
FIG. 1 illustrates main structural components of an exemplary horizontal-axis wind turbine comprising three wind turbine blades.

FIG. 1 illustrates main structural components of an exemplary horizontal-axis wind turbine 1 comprising three wind turbine blades 7 constituting the rotor 4 of the wind turbine. The wind turbine 1 comprises a tower 2 and a nacelle 3 mounted at top of the tower 2. The rotor is operatively coupled to a generator 5 within the nacelle 3 via a drive train (not shown) for converting mechanical kinetic energy harvested from the wind into electrical energy. In addition to the generator 5, the nacelle 3 may house additional components required to operate and optimize the performance of the wind turbine 1. The tower 2 supports the load presented by the nacelle 3, the rotor 4, and other wind turbine components within the nacelle 3.

The rotor 4 includes a central hub 6 and three elongated wind turbine blades 7 extending radially outward from the central hub 6, i.e., longitudinally in a lengthwise direction, from a root section of the blades 7 at the hub 6 to a tip section of the blades. In operation, the blades 7 are configured to interact with the passing air flow to produce lift that causes the central hub 6 to rotate about the longitudinal axis of the rotor 4. Wind speed in excess of a minimum level will activate the rotor 4 and allow it to rotate within a plane substantially perpendicular to the direction of the wind. The rotation is converted to electric power by the generator 5 and is usually supplied to the utility grid.

Figure 2:
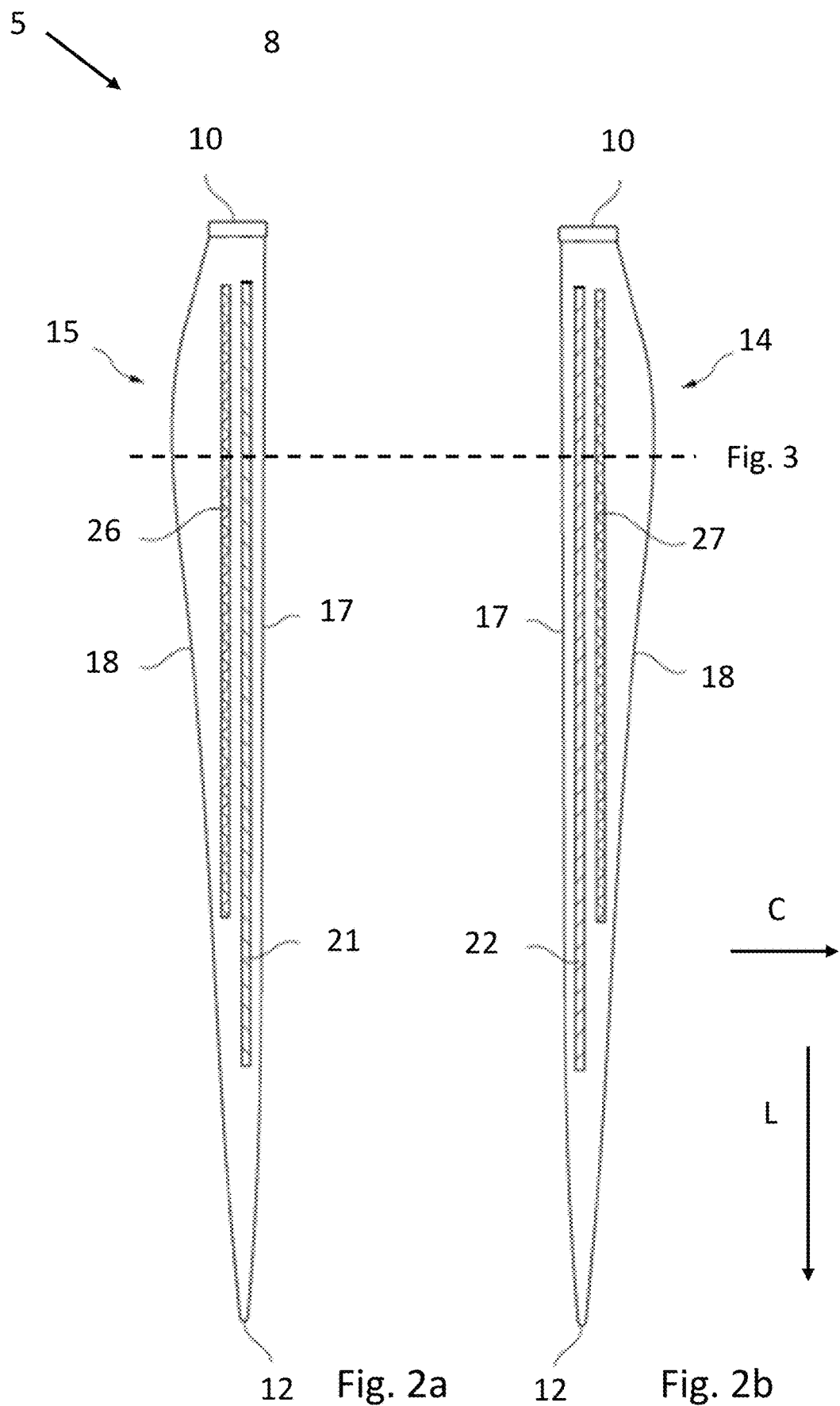
FIGS. 2a-b illustrate embodiments of shell portions of a wind turbine blade according to the present disclosure.

FIGS. 2a-b illustrate shell portions 14, 15 of a wind turbine blade according to the present disclosure.

The wind turbine blade comprises a windward shell portion 15 and a leeward shell portion 14 which are illustrated separately in FIG. 2a and FIG. 2b, respectively. When the wind turbine blade is installed in a wind turbine as illustrated in FIG. 1, the two shell portions 14, 15 are joined along the leading edge 17 and along the trailing edge 18. The two shell portions 14, 15 may be formed as a single part.

Each of the shell portions 14, 15 and the wind turbine blade extends in a chordwise direction between the leading edge 17 and the trailing edge 18 of the wind turbine blade. The chordwise direction is indicated in the figure by an arrow and the letter "C".

Further, the shell portions 14, 15 and the wind turbine blade extend in a lengthwise direction between root end 10 and a tip end 12 of the wind turbine blade. The lengthwise direction is indicated in the figure by an arrow and the letter "L". The lengthwise direction is substantially perpendicular to the chordwise direction.

The wind turbine blade further comprises a leading reinforcement arrangement 20 and a trailing reinforcement arrangement 25. The leading reinforcement arrangement comprises reinforcement structures 21 and 22 and the trailing reinforcement arrangement 25 comprises reinforcement structures 26 and 27. The reinforcement structures engage the shell portions 14, 15 to mechanically reinforce the wind turbine blade. Each of the reinforcement structures 21, 22, 26, 27 extend in the lengthwise direction.

In this particular example, each of the reinforcement structures 21,22,26,27 constitute a separate spar cap comprising layers of pultruded fibre elements.

Generally, the reinforcement structures 21,22, 26,27 each resist deformation of the shell portion 14,15 with which they engage. Consequently, these reinforcement structures also resist deformation of the wind turbine blade when in use. In particular, the reinforcement structures counteract flapwise bending and vibration of the wind turbine blade due to their tensional and compressional stiffness in the lengthwise direction.

A leading windward reinforcement structure 21 and a trailing windward reinforcement structure 26 engage with the windward shell portion 15. Similarly, a leading leeward reinforcement structure 22 and a trailing leeward reinforcement structure 27 engage with the leeward shell portion 14. In this example, the reinforcement structures 21, 22, 26, 27 engage with the shell portions 14, 15 by being integrated into the shell portions 14, 15.

The trailing windward reinforcement structure 26 is associated with a first stiffness in the lengthwise direction, and the trailing leeward reinforcement structure 27 is associated with a second stiffness in the lengthwise direction.

The first stiffness is greater than the second stiffness at a chordwise plane of the wind turbine blade transverse to the lengthwise direction. In the exemplary embodiment shown, such a chordwise plane is indicated by a horizontal dashed line with reference to FIG. 3, in which a cross-sectional illustration of this chordwise plane of the wind turbine blade is illustrated.

The provision of a first stiffness greater than the second stiffness improves the vibrational properties of the exemplary wind turbine blade illustrated in FIGS. 2a-b. In particular, damping of flapwise vibrations is improved.

Figure 3:
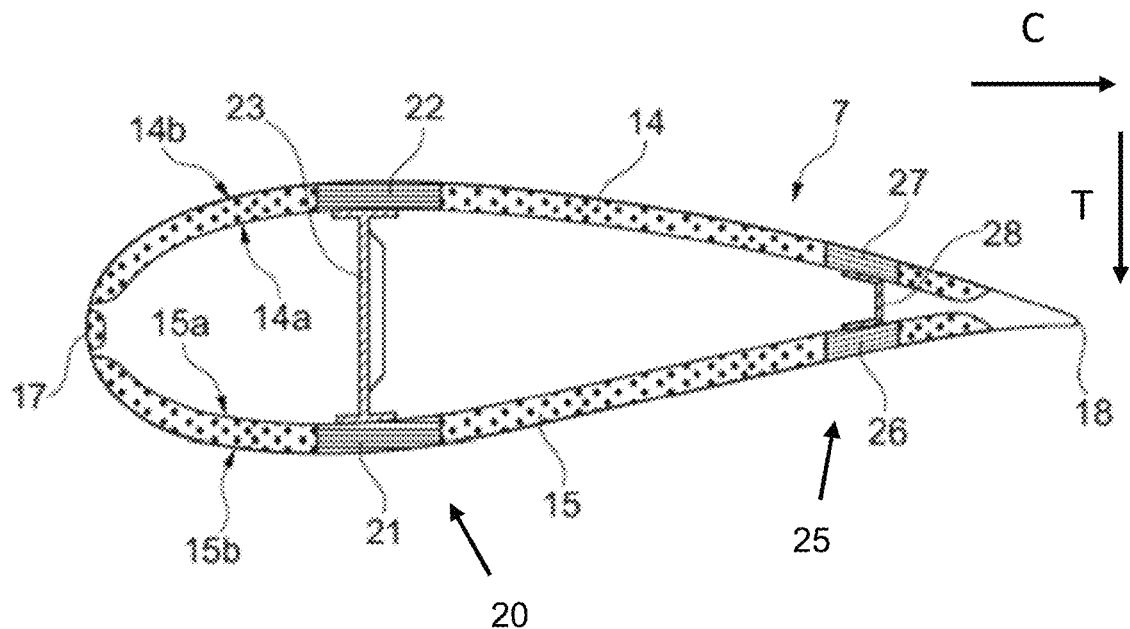
FIG. 3 illustrates a cross-sectional view of a chordwise plane of an embodiment of a wind turbine blade according to the present disclosure.

FIG. 3 illustrates a cross-sectional view of a chordwise plane of a wind turbine blade 7 according to the present disclosure. The illustrated chordwise plane corresponds to a chordwise plane of the wind turbine blade illustrated in FIGS. 2a-b (see horizontal dashed line and reference to FIG. 3).

In the illustration, the chordwise direction is indicated by a horizontal arrow and the letter "C". Further, a thickness direction perpendicular to the chordwise direction and the lengthwise direction is indicated by a vertical arrow and the letter "T".

The cross-sectional view of the figure illustrates the leeward shell portion 14 and the windward shell portion 15. In addition, the figure illustrates that these shell portions 14, 15 define respective inner surfaces 14a, 15a and outer surfaces 14b, 15b. The inner surface 14a of the leeward shell portion 14 faces the inner surface 15a of the windward shell portion 15, whereby an at least partially hollow blade is defined by the two shell portions.

The blade 7 extends in a thickness direction between the leeward shell portion 14 and the windward shell portion 15.

The wind turbine blade 7 comprises a leading reinforcement arrangement 20 and a trailing reinforcement arrangement 25. The leading reinforcement arrangement 20 comprises a leading windward reinforcement structure 21 and a leading leeward reinforcement structure 22. The trailing reinforcement arrangement 25 comprises a trailing windward reinforcement structure 26 and a trailing leeward reinforcement structure 27.

As shown, the leading windward reinforcement structure 21 and the trailing windward reinforcement structure 26 are integrated in the windward shell portion 15 to engage this shell portion 15, and that the leading leeward reinforcement structure 22 and the trailing leeward reinforcement structure 27 are integrated in the leeward shell portion 14 to engage this shell portion 14.

Furthermore, the leading windward reinforcement structure 21 and the leading leeward reinforcement structure 22 are interconnected by a leading web 23, and that the trailing windward reinforcement structure 26 and the trailing leeward reinforcement structure 27 are interconnected by a trailing web 28.

As also described in relation to FIGS. 2a-b, the trailing windward reinforcement structure 26 has a first stiffness, and the trailing leeward reinforcement structure 27 has a second stiffness, wherein the first stiffness is greater than the second stiffness.

Figure 4:
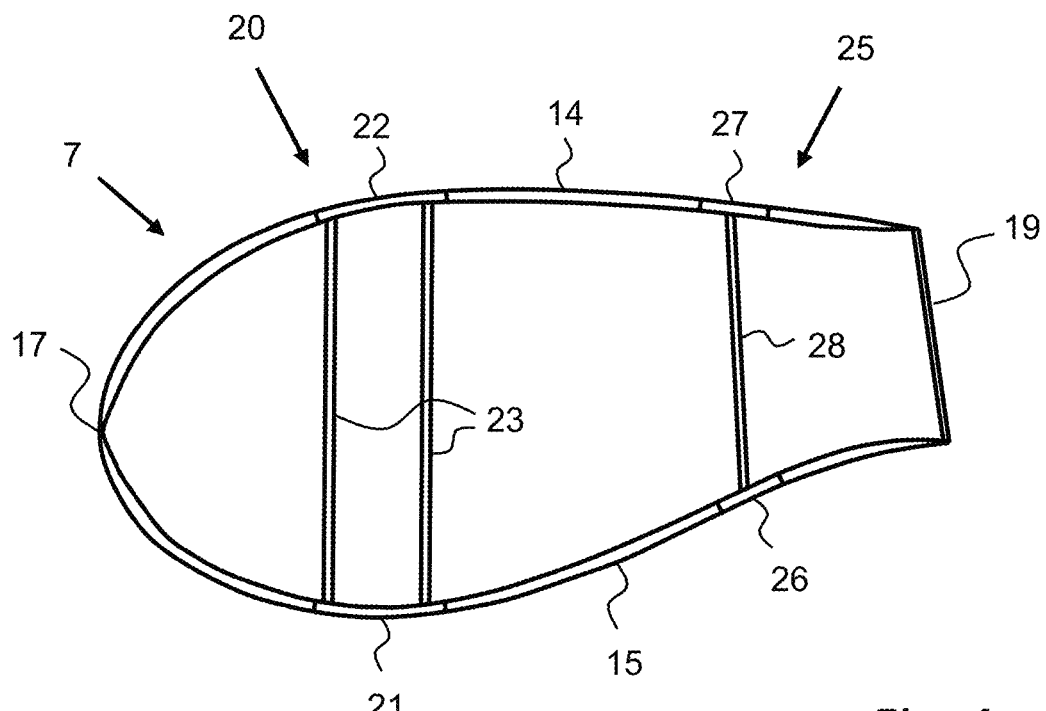
FIG. 4 illustrates a cross-sectional view of a chordwise plane of another wind turbine blade according to an embodiment of the present disclosure, FIG. 5 schematically illustrates an exemplary first stiffness and an exemplary second stiffness along the lengthwise direction of a wind turbine blade according to an embodiment of the present disclosure, FIG. 6 schematically illustrates exemplary first, second, third, and fourth stiffnesses along the lengthwise direction of a wind turbine blade according to an embodiment of the present disclosure, FIGS. 7a-b schematically illustrate a possible correlation between thickness of a reinforcement structure and a stiffness of that reinforcement structure in an embodiment of a wind turbine blade according to the present disclosure.

FIG. 4 illustrates a cross-sectional view of a chordwise plane of another wind turbine blade 7 according to the present disclosure. In comparison with the wind turbine blade illustrated in FIG. 4, the wind turbine blade 7 illustrated in FIG. 4 has a truncated trailing edge 19, thereby providing at least a part of the blade with a flatback airfoil section.

In the illustrated chordwise plane, the first stiffness of the trailing windward reinforcement structure 26 is greater than the second stiffness of the trailing leeward reinforcement structure 27 in the lengthwise direction of the blade.

Due to the truncated trailing edge 19, the reinforcement structures 26, 27 of the trailing reinforcement arrangement are spaced relatively far apart in the thickness direction of the blade, for example in comparison with the reinforcement structures of the trailing reinforcement arrangement of the blade illustrated in FIG. 3. As a result, the impact from the difference in stiffness between the trailing reinforcement structures 26, 27 is enhanced, thereby improving vibrational properties of the blade 7.

Figure 5:
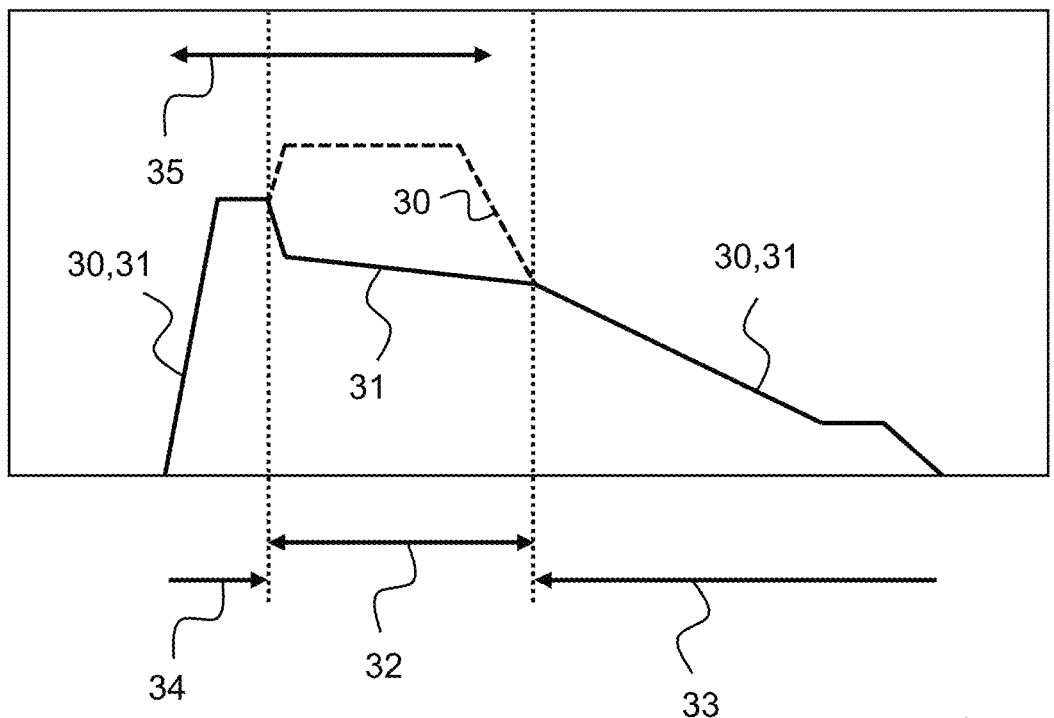

FIG. 5 schematically illustrates an exemplary first stiffness 30 and an exemplary second stiffness 31 along the lengthwise direction of a wind turbine blade.

The horizontal direction in the figure corresponds to the lengthwise direction, with the root end on the left-hand side and the tip end on the right-hand side. The vertical direction is the magnitude of the stiffnesses 30, 31.

In the following, the first and second stiffnesses 30, 31 are qualitatively described moving from the root end of the blade (left-hand side) to the tip end of the blade (right-hand side).

Initially, no trailing reinforcement arrangement is present, and accordingly, no first and second stiffness 30, 31 is indicated. Moving towards the tip end from the root end, both the first and the second stiffness 30, 31 increase similarly until a section of constant stiffness is reached. Until this point, the first and second stiffnesses are substantially the same. Next, first stiffness 30 of the trailing windward reinforcement structure increases while the second stiffness 31 of the trailing leeward reinforcement structure decreases. The result is that the first stiffness is greater than the second stiffness. Along a substantial lengthwise section of the blade, a difference is present. Eventually, the first stiffness 30 decreases until reaching the magnitude of the second stiffness 31. Next, both stiffnesses 30,31 gradually decrease towards the tip end of the blade, until the trailing reinforcement structure eventually terminates.

In context of the present disclosure, it can be convenient to define a mid-span section 32, an outboard section 33, and an inboard section 34 relative to different parts of the trailing reinforcement structures and their stiffnesses.

In the example illustrated in FIG. 5, a stiffness ratio of the first stiffness 30 to the second stiffness 31 is greater throughout the mid-span section 32 than in the outboard section 33. Namely, in the outboard section 33 the stiffness ratio is 1 and greater than 1 in the mid-span section 32. The mid-span 32 section may extend at least 10% of the length of the blade and at most 35% of the blade. The stiffness ratio in an inboard section 34 may also be 1.

In addition, the first stiffness 30 is preferably greater within at least a part of the mid-span section 32 than the second stiffness 31 anywhere along the lengthwise direction of the blade.

The mid-board section 32, in which the stiffness ratio is greater than 1, overlaps with a flatback airfoil section 35 of the blade along the lengthwise direction.

Figure 6:
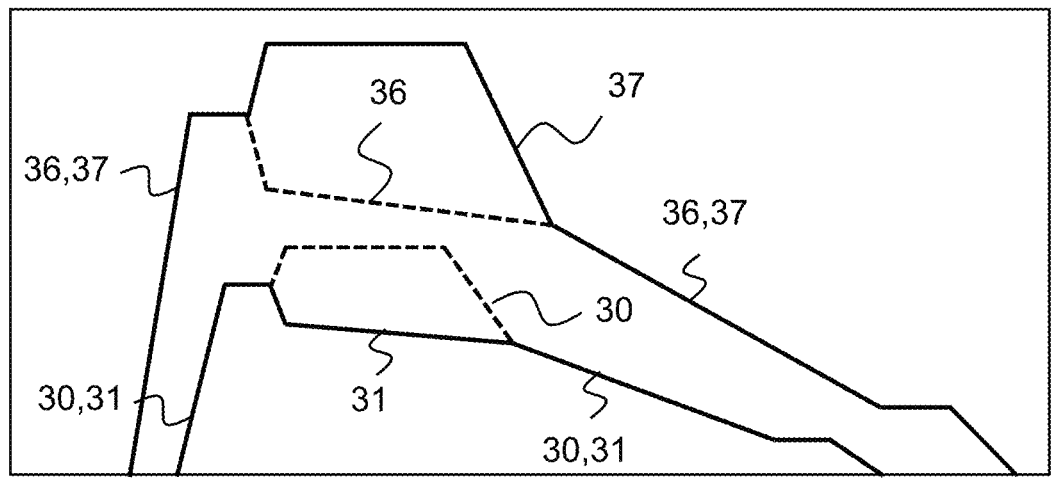

FIG. 6 schematically illustrates exemplary first, second, third, and fourth stiffnesses 30, 31, 36, 37 along the lengthwise direction of a wind turbine blade.

In the illustrated example, the first stiffness 30 of the trailing windward reinforcement structure and the second stiffness 31 of the trailing leeward reinforcement structure are substantially similar to the example described in relation to FIG. 5. However, in addition, FIG. 6 illustrates a third stiffness 36 of a leading windward reinforcement structure and a fourth stiffness 37 of a leading leeward reinforcement structure.

In comparison with the first and second stiffnesses 30, 31, the third and fourth stiffnesses 36, 37 generally have a larger magnitude and extend further along the lengthwise direction of the blade (since the leading reinforcement arrangement extends further along the lengthwise direction of the blade).

In the section in which the first stiffness 30 is greater than the second stiffness 31, the fourth stiffness 37 is greater than the third stiffness 36. The magnitude and extent of the differences in stiffnesses in the leading reinforcement arrangement and the trailing reinforcement can be compared. This may, for example, be quantified by considering the difference in stiffnesses at a chordwise plane. Preferably, at a given chordwise plane, the difference between the third stiffness and the fourth stiffness is at least 50% of the difference between the second stiffness and the first stiffness, for example at least 60% of the difference, for example at least 70% of the difference, such as at least 80% of the difference.

Figure 7A:
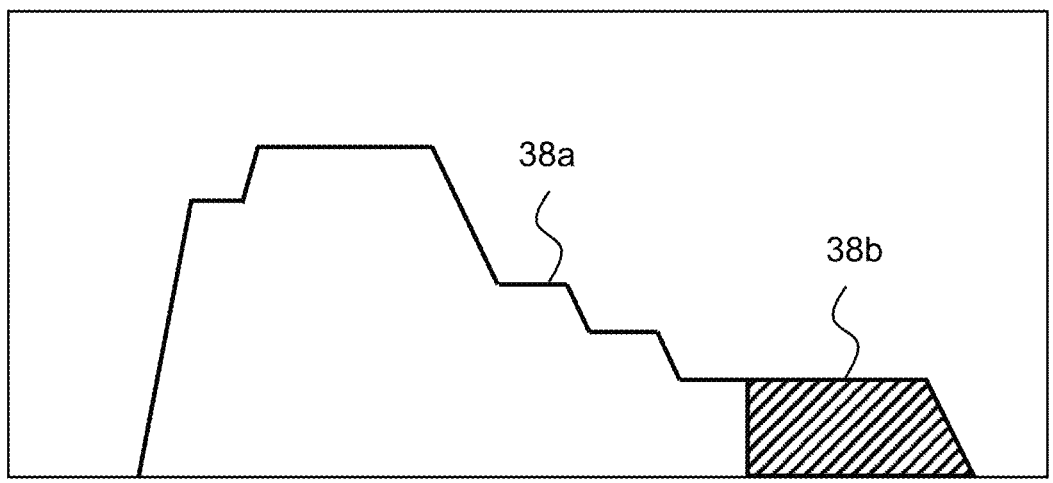
Figure 7B:
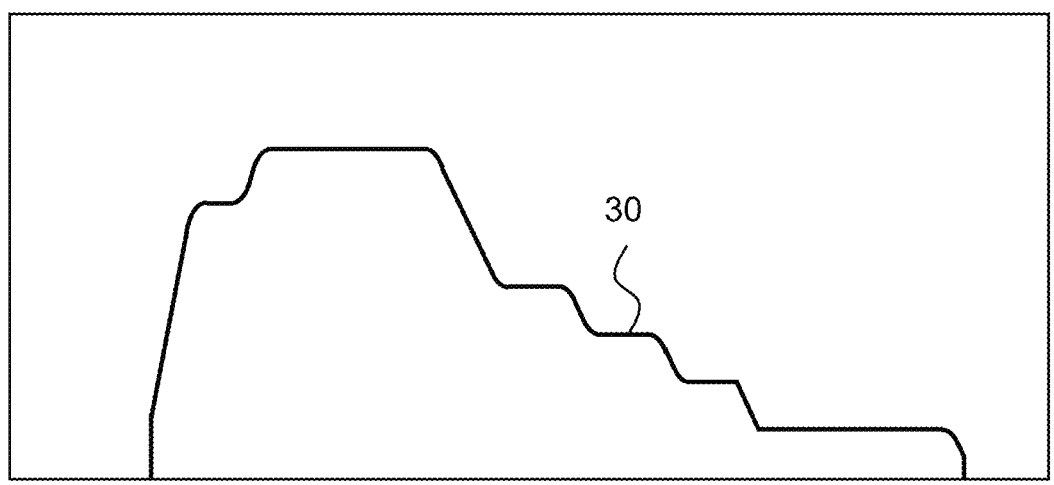

FIGS. 7a-b schematically illustrate how a thickness 38a-b of a reinforcement structure may correlate to a stiffness 30 of that reinforcement structure. A cross-sectional area correlates similarly to a stiffness. FIG. 7a illustrates a thickness 38a-b of a reinforcement structure, with the horizontal direction corresponding to the lengthwise direction and the vertical direction corresponding to the thickness of the reinforcement structure. In comparison, FIG. 7b illustrates the corresponding stiffness 30 of the same reinforcement structure.

The reinforcement structure is a trailing windward reinforcement structure, but the illustrated principles apply to any reinforcement structure.

The reinforcement structure may be formed of different materials. In a first lengthwise part, the reinforcement structure may be formed by carbon fibre-reinforced plastic (reference numeral 38a), and in a second lengthwise part, the reinforcement structure may be formed by glass-fibre reinforced plastic (reference numeral 38b).

From the thickness of the reinforcement structure, a stiffness at the chordwise plane can be determined by considering a lengthwise portion of the reinforcement arrangement relative to the chordwise plane, the lengthwise portion being centred at the chordwise plane and extending, say, 1.0 meter in the lengthwise direction. Hence, for each point in FIG. 7b along the lengthwise direction, the stiffness 30 can be determined by calculating the stiffness k using k=E×A/L, where E is elastic modulus, A is cross-sectional area (transverse to direction of tension/compression) and L is the length of the relevant portion of the reinforcement arrangement, i.e. one unit of length. As evident from FIG. 7a, both material and thickness may vary along the lengthwise direction, and the stiffness varies correspondingly, as illustrated in FIG. 7b.

Figure 8:
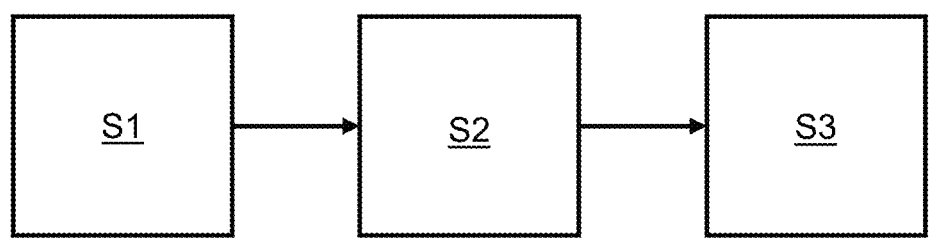
FIG. 8 illustrates a flow chart of a method of manufacturing a wind turbine blade according to an embodiment of the present disclosure.

FIG. 8 illustrates a flow chart of a method of manufacturing a wind turbine blade according to the present disclosure.

In a first step S1 of the method, a leading leeward reinforcement structure and a trailing leeward reinforcement structure engages with a leeward shell portion.

In a second step S2, a leading windward reinforcement structure and a trailing windward reinforcement structure engages with a windward shell portion.

The engagement of reinforcement structure with shell portions may be implemented by integration into the shell (for example during moulding), or by bonding to the shell (for example, after moulding the shell).

In a third step S3, a wind turbine blade is formed from the leeward shell portion and the trailing shell portion. The wind turbine blade extends in a lengthwise direction between a root end and a tip end. Each of the shell portions extend in a chordwise direction between a leading edge and a trailing edge of the wind turbine blade. By forming the blade, a leading reinforcement arrangement comprising at least the leading leeward reinforcement arrangement and the leading windward reinforcement arrangement is provided. Similarly, by forming the blade, a trailing reinforcement arrangement comprising at least the trailing leeward reinforcement arrangement and the trailing windward reinforcement arrangement is provided. The reinforcement arrangements and the reinforcement structures thereof extend in the lengthwise direction of the blade.

When the blade is formed, each respective reinforcement structure of the leading reinforcement arrangement is closer to the leading edge than each respective reinforcement arrangement of the trailing reinforcement arrangement.

Further, after manufacturing, the trailing windward reinforcement structure has a first stiffness in the lengthwise direction, and the trailing leeward reinforcement structure has a second stiffness in the lengthwise direction, wherein the first stiffness is greater than the second stiffness at a chordwise plane of the wind turbine blade transverse to the lengthwise direction.

Thereby, a wind turbine blade having improved vibrational damping properties can be manufactured.

The method steps is not limited to any particular sequence of execution and may further, in principle, be performed at least partly simultaneously.

Various versions and elements of the invention have been exemplified for the purpose of clarification rather than limitation. Well-known details of methods and systems have been omitted to not obscure the content of the disclosure with redundancy. Various elements and features of the invention and this disclosure may be combined in any way possible within the scope of the claims.

LIST OF FIGURE REFERENCES 1 wind turbine
2 wind turbine tower
3 nacelle
4 rotor
5 generator
6 hub
7 wind turbine blade
10 root end
12 tip end
14 leeward shell portion
15 windward shell portion
17 leading edge
18 trailing edge
19 truncated trailing edge
20 leading reinforcement arrangement
21 leading windward reinforcement structure
22 leading leeward reinforcement structure
23 leading web
25 trailing reinforcement arrangement
26 trailing windward reinforcement structure
27 trailing leeward reinforcement structure
28 trailing web
30 first stiffness
31 second stiffness
32 mid-span section
33 outboard section
34 inboard section
35 flatback airfoil section
36 third stiffness
37 fourth stiffness
38 thickness of reinforcement structure
S1-S3 method steps

The invention claimed is:

1. A wind turbine blade extending in a lengthwise direction between a root end and a tip end, the wind turbine blade comprising:
a leeward shell portion and a windward shell portion, each of the shell portions extending in a chordwise direction between a leading edge and a trailing edge of the wind turbine blade;
a leading reinforcement arrangement extending in the lengthwise direction and comprising at least a leading leeward reinforcement structure engaging the leeward shell portion and a leading windward reinforcement structure engaging the windward shell portion; and
a trailing reinforcement arrangement extending in the lengthwise direction and comprising at least a trailing leeward reinforcement structure engaging the leeward shell portion and a trailing windward reinforcement structure engaging the windward shell portion,
wherein each respective reinforcement structure of the leading reinforcement arrangement is closer to the leading edge than each respective reinforcement structure of the trailing reinforcement arrangement, wherein the trailing windward reinforcement structure has a first stiffness in the lengthwise direction and the trailing leeward reinforcement structure has a second stiffness in the lengthwise direction, wherein the first stiffness is greater than the second stiffness at a chordwise plane of the wind turbine blade, the chordwise plane being transverse to the lengthwise direction, and wherein a stiffness ratio of the first stiffness to the second stiffness varies along the lengthwise direction.

2. The wind turbine blade according to claim 1, wherein the first stiffness is greater than the second stiffness in at least a part of an extent along the lengthwise direction from 15% to 55% of a relative length of the blade measured from the root end to the tip end.

3. The wind turbine blade according to claim 1, wherein the first stiffness is at least 5% greater than the second stiffness.

4. The wind turbine blade according to claim 1, wherein the blade comprises an inboard section, a mid-span section and an outboard section, wherein both the trailing leeward reinforcement structure and the trailing windward reinforcement structure extend in the lengthwise direction along the mid-span section and along the outboard section, wherein the stiffness ratio is greater in a part of the mid-span section than in a part of the outboard section.

5. The wind turbine blade according to claim 1, wherein the blade comprises an inboard section, a mid-span section and an outboard section, wherein both the trailing leeward reinforcement structure and the trailing windward reinforcement structure further extend in the lengthwise direction along the inboard section, wherein the stiffness ratio is greater in a part of the mid-span section than in a part of the inboard section.

6. The wind turbine blade according to claim 4, wherein the stiffness ratio is greater throughout the mid-span section, wherein the length of the mid-span section is at least 10% of the length of the wind turbine blade in the lengthwise direction.

7. The wind turbine blade according to claim 4, wherein the first stiffness is greater in at least part of the mid-span section than the second stiffness in any part of the leeward windward reinforcement structure.

8. The wind turbine blade according to claim 1, wherein a subsection of the wind turbine blade along the lengthwise direction has a flatback airfoil section having a truncated trailing edge.

9. The wind turbine blade according to claim 8, wherein the flatback airfoil section overlaps a mid-span section along the lengthwise direction, the mid-span section neighbouring outboard and inboard sections of the blade, the outboard section arranged closer to the tip end than the mid-span section, and the inboard section arranged closer to the hub than the mid-span section.

10. The wind turbine blade according to claim 1, wherein the leading reinforcement arrangement and/or the trailing reinforcement arrangement are formed by layers of pultruded fibre elements.

11. The wind turbine blade according to claim 1, wherein the trailing windward reinforcement structure has a greater cross-sectional area than and/or different material composition than the trailing leeward reinforcement structure.

12. A wind turbine blade extending in a lengthwise direction between a root end and a tip end, the wind turbine blade comprising:

a leeward shell portion and a windward shell portion, each of the shell portions extending in a chordwise direction between a leading edge and a trailing edge of the wind turbine blade;

a leading reinforcement arrangement extending in the lengthwise direction and comprising at least a leading leeward reinforcement structure engaging the leeward shell portion and a leading windward reinforcement structure engaging the windward shell portion; and a trailing reinforcement arrangement extending in the lengthwise direction and comprising at least a trailing leeward reinforcement structure engaging the leeward shell portion and a trailing windward reinforcement structure engaging the windward shell portion, wherein each respective reinforcement structure of the leading reinforcement arrangement is closer to the leading edge than each respective reinforcement structure of the trailing reinforcement arrangement, wherein the trailing windward reinforcement structure has a first stiffness in the lengthwise direction and the trailing leeward reinforcement structure has a second stiffness in the lengthwise direction, wherein the first stiffness is greater than the second stiffness at a chordwise plane of the wind turbine blade, the chordwise plane being transverse to the lengthwise direction, wherein the leading windward reinforcement structure has a third stiffness in the lengthwise direction and the leading leeward reinforcement structure has a fourth stiffness in the lengthwise direction, and wherein the fourth stiffness is greater than the third stiffness at the chordwise plane of the wind turbine blade transverse to the lengthwise direction.

13. A method for manufacturing a wind turbine blade, the method comprising the steps of:

engaging a leading leeward reinforcement structure and a trailing leeward reinforcement structure with a leeward shell portion;

engaging a leading windward reinforcement structure and a trailing windward reinforcement structure with a windward shell portion; and forming a wind turbine blade from the leeward shell portion and the trailing shell portion, the wind turbine blade extending in a lengthwise direction between a root end and a tip end, each of the shell portions extending in a chordwise direction between a leading edge and a trailing edge of the wind turbine blade thereby providing a leading reinforcement arrangement comprising at least the leading leeward reinforcement arrangement and the leading windward reinforcement arrangement and providing a trailing reinforcement arrangement comprising at least the trailing leeward reinforcement structure and the trailing windward reinforcement structure, the leading reinforcement arrangement and the trailing reinforcement arrangement extending in the lengthwise direction, wherein each respective reinforcement structure of the leading reinforcement arrangement is closer to the leading edge than each respective reinforcement structure of the trailing reinforcement arrangement, wherein the trailing windward reinforcement structure has a first stiffness in the lengthwise direction and the trailing leeward reinforcement structure has a second stiffness in the lengthwise direction, wherein the first stiffness is greater than the second stiffness at a chordwise plane of the wind turbine blade, the chordwise plane being transverse to the lengthwise direction, and wherein a stiffness ratio of the first stiffness to the second stiffness varies along the lengthwise direction.

14. The wind turbine blade according to claim 1, wherein the blade comprises an inboard section, a mid-span section and an outboard section, wherein the stiffness ratio is greater than one in a part of the mid-span section, and wherein the first stiffness increases in the part of the mid-span section.

15. The wind turbine blade according to claim 1, wherein the blade comprises an inboard section, a mid-span section and an outboard section, wherein the stiffness ratio is greater than one in a part of the mid-span section, and wherein the second stiffness decreases in the part of the outboard section.

16. The wind turbine blade according to claim 1, wherein the blade comprises an inboard section, a mid-span section and an outboard section, wherein the stiffness ratio is greater than one in a part of the mid-span section, and wherein the stiffness ratio is equal to one in a part of the inboard section.

17. The wind turbine blade according to claim 1, wherein the blade comprises an inboard section, a mid-span section and an outboard section, wherein the stiffness ratio is greater than one in a part of the mid-span section, and wherein the stiffness ratio is equal to one in a part of the outboard section.

* * * * *